(12) United States Patent
Urushihata (10) Patent No.: US 8,677,959 B2
(45) Date of Patent: Mar. 25, 2014

(54) VARIABLE VALVE TIMING CONTROLLER FOR INTERNAL COMBUSTION ENGINE

(75) Inventor: Harayuki Urushihata, Chiryu (JP)

(73) Assignee: Denso Corporation, Kariya (JP)

( * ) Notice: Subject to any disclaimer, the term of this patent is extended or adjusted under 35 U.S.C. 154(b) by 327 days.

(21) Appl. No.: 12/878,337

(22) Filed: Sep. 9, 2010

(65) Prior Publication Data
US 2011/0061619 A1    Mar. 17, 2011

(30) Foreign Application Priority Data
Sep. 11, 2009    (JP) ................. 2009-210098

(51) Int. Cl.
*F01L 1/34* (2006.01)

(52) U.S. Cl.
USPC .................... 123/90.17; 123/90.15

(58) Field of Classification Search
USPC ................ 701/103; 123/90.15, 90.16, 90.17, 123/90.31, 90.34
See application file for complete search history.

(56) References Cited

U.S. PATENT DOCUMENTS

| | | | |
|---|---|---|---|
| 4,313,165 A * | 1/1982 | Clelford et al. ................ | 701/3 |
| 5,738,056 A | 4/1998 | Mikame et al. | |
| 6,250,265 B1 * | 6/2001 | Simpson ................ | 123/90.17 |
| 6,330,870 B1 * | 12/2001 | Inoue et al. ................ | 123/90.17 |
| 6,382,155 B2 * | 5/2002 | Simpson ................ | 123/90.17 |
| 6,732,689 B2 * | 5/2004 | Wada et al. ................ | 123/90.17 |
| 6,807,931 B2 * | 10/2004 | Taylor et al. ................ | 123/90.17 |
| 6,883,479 B2 * | 4/2005 | Simpson ................ | 123/90.17 |
| 6,938,592 B2 * | 9/2005 | Taylor et al. ................ | 123/90.15 |
| 8,047,169 B2 * | 11/2011 | Mashiki et al. ................ | 123/90.17 |
| 2004/0055550 A1 | 3/2004 | Smith | |
| 2005/0098130 A1 | 5/2005 | Hirowatari et al. | |
| 2010/0139592 A1 | 6/2010 | Takemura | |
| 2012/0255509 A1 * | 10/2012 | Lichti et al. ................ | 123/90.15 |

FOREIGN PATENT DOCUMENTS

| | | | |
|---|---|---|---|
| JP | 9-282006 | 10/1997 | |
| JP | 2003-222010 | * 8/2003 | ................ F01L 1/34 |
| JP | P2005-9393 A | 1/2005 | |
| JP | 2005-146922 | * 9/2005 | ................ F01L 1/34 |

OTHER PUBLICATIONS

Japanese Office Action dated Sep. 19, 2012, issued in corresponding Japanese Application No. 2009-210098, with English translation.

* cited by examiner

*Primary Examiner* — Stephen K Cronin
*Assistant Examiner* — Carl Staubach
(74) *Attorney, Agent, or Firm* — Nixon & Vanderhye PC (57) ABSTRACT

A variable valve timing controller for an internal combustion engine includes a hydraulic variable valve timing unit, a lock pin, and a hydraulic control valve. The lock pin is configured to lock the VCT phase at an intermediate lock position. The variable valve timing controller controls a valve drive electric current that is used for actuating the hydraulic control valve. The controller controls the valve drive electric current based on a first control characteristic in the operation of the hydraulic control valve under a first control range. The controller controls the valve drive electric current based on a second control characteristic in the operation of the hydraulic control valve under a second control range. The first control characteristic is different from the second control characteristic.

8 Claims, 10 Drawing Sheets

VARIABLE VALVE TIMING CONTROLLER FOR INTERNAL COMBUSTION ENGINE

CROSS REFERENCE TO RELATED APPLICATION

This application is based on and incorporates herein by reference Japanese Patent Application No. 2009-210098 filed on Sep. 11, 2009.

BACKGROUND OF THE INVENTION

1. Field of the Invention

The present invention relates to a variable valve timing controller for an internal combustion engine, which has a camshaft and a crankshaft. The variable valve timing controller has an intermediate lock mechanism that locks a rotational phase (variable cam timing phase) of the camshaft relative to the crankshaft at an intermediate lock position.

2. Description of Related Art

As described in JP-A-H9-324613 (corresponding to U.S. Pat. No. 5,738,056) or JP-A-2001-159330 (corresponding to U.S. Pat. No. 6,330,870), during the stop of the engine, a conventional hydraulic variable valve timing unit is configured to set a lock position at a generally middle of an adjustable range of the variable cam timing (VCT) phase. Thus, it is possible to enlarge the adjustable range of the valve timing (VCT phase). In the above configuration, an intermediate lock position, at which the VCT phase is locked during the stop of the engine, is determined to be suitable for the start of the engine. Thus, the engine is started under a state, where the VCT phase is at the intermediate lock position. Then, when oil pressure has been increased to an appropriate oil pressure due to engine rotation increase (oil pump rotation increase) after the start of the engine has been completed, the lock of the VCT phase is released such that the VCT phase is feed-back controlled to a target phase that is determined in accordance with an engine operational state. Then, when a lock request is generated for stopping the engine or during a stand-by operation, a lock control is executed to lock the VCT phase at the intermediate lock position.

However, in a hydraulic control valve having a certain configuration, it is disadvantageously difficult to achieve both of (a) accuracy and reliability of the phase control and (b) high responsivity in a lock pin control (lock operation and lock release operation).

SUMMARY OF THE INVENTION

The present invention is made in view of the above disadvantages. Thus, it is an objective of the present invention to address at least one of the above disadvantages.

To achieve the objective of the present invention, there is provided a variable valve timing controller for an internal combustion engine having a crankshaft and a camshaft, the variable valve timing controller including a hydraulic variable valve timing unit, a lock pin, a hydraulic control valve, and control means. The hydraulic variable valve timing unit is configured to adjust valve timing by changing a variable cam timing (VCT) phase that is a rotational phase of the camshaft relative to the crankshaft. The lock pin is configured to lock the VCT phase at an intermediate lock position located within an adjustable range of the VCT phase. The hydraulic control valve is configured to control oil pressure that actuates the variable valve timing unit and the lock pin. Control means controls a valve drive electric current that is used for actuating the hydraulic control valve. The control means operates the hydraulic control valve under a plurality of control ranges. The control means controls the valve drive electric current based on a first control characteristic in the operation of the hydraulic control valve under a first one of the plurality of control ranges. The control means controls the valve drive electric current based on a second control characteristic in the operation of the hydraulic control valve under a second one of the plurality of control ranges. The first control characteristic is different from the second control characteristic.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF PREFERRED EMBODIMENTS

The first embodiment and the second embodiment of the present invention, which are applied to a variable valve timing unit of an intake valve, will be described below.

First Embodiment

The first embodiment of the present invention will be described with reference to FIGS. 1 to 10.

Figure 1:
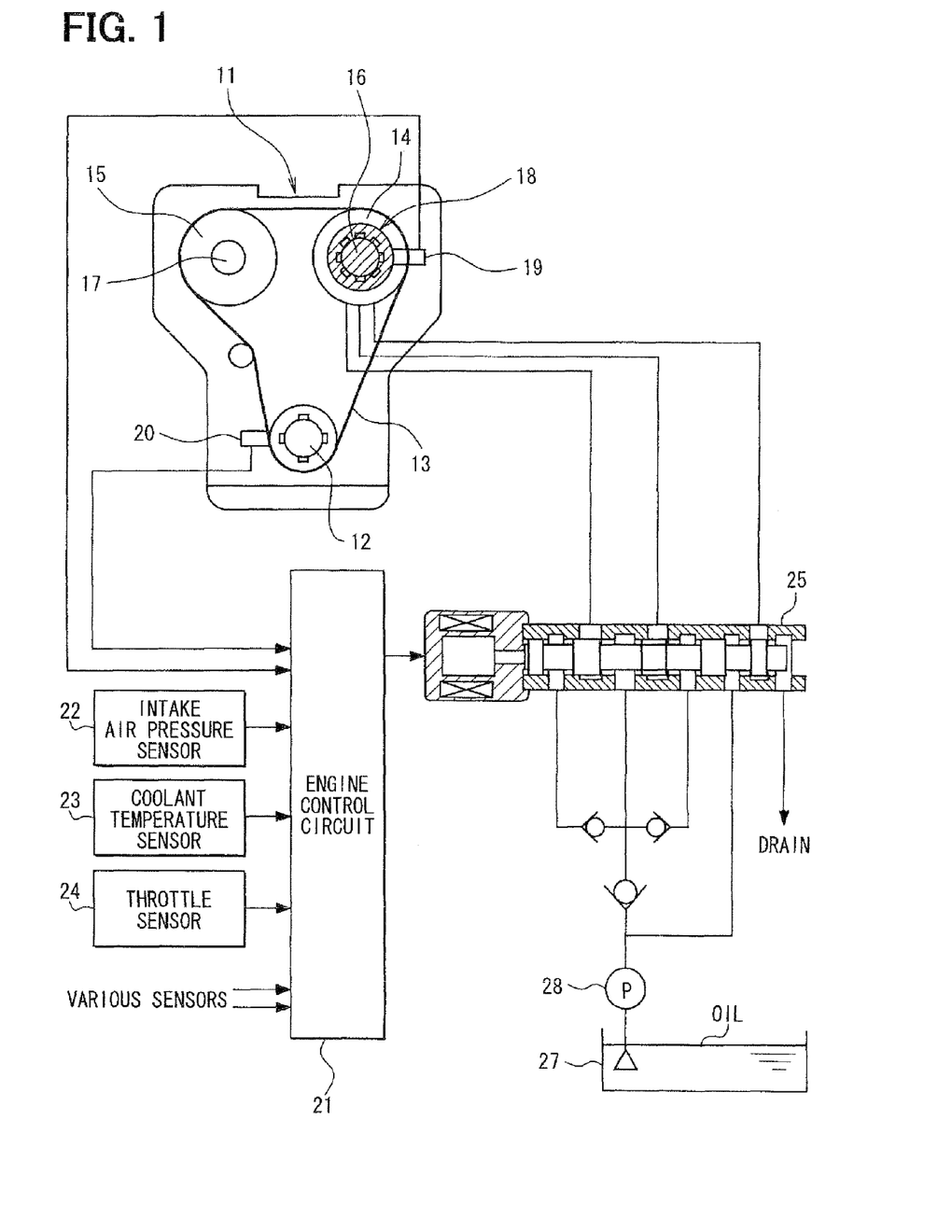
FIG. 1 is a schematic configuration illustrating an entirety of an engine control system according to the first embodiment of the present invention.

As shown in FIG. 1, an engine 11 (internal combustion engine) transmits drive force from a crankshaft 12 to an intake camshaft 16 and an exhaust camshaft 17 through a timing chain 13 and sprockets 14, 15. The intake camshaft 16 is provided with a variable valve timing unit 18 (VCT technology) that adjusts an advance amount or a variable cam timing (VCT) phase of the intake camshaft 16 relative to the crankshaft 12. More specifically, the VCT phase is a rotational angular position of the intake camshaft 16 relative to a rotational angular position of the crankshaft 12.

Also, a cam angle sensor 19 is provided at a position radially outward of the intake camshaft 16 for outputting cam angle signal pulses at predetermined cam angles in order to identify cylinders. Also, a crank angle sensor 20 is provided at a position radially outward of the crankshaft 12 for outputting crank angle signal pulses at predetermined crank angles. The signals outputted from the cam angle sensor 19 and the crank angle sensor 20 are fed to an engine control circuit 21. The engine control circuit 21 computes actual valve timing (actual VCT phase) of the intake valve and computes an engine rotation speed based on a frequency (pulse interval) of the output pulses of the crank angle sensor 20. Also, the other signals outputted by various sensors (an intake air pressure sensor 22, a coolant temperature sensor 23, a throttle sensor 24) for detecting an engine operational state are fed to the engine control circuit 21.

The engine control circuit 21 executes fuel injection control and ignition control based on the engine operational state detected by the various sensors. Also, the engine control circuit 21 executes variable valve timing control (VCT phase feed-back control), in which the engine control circuit 21 feed-back controls oil pressure that actuates the variable valve timing unit 18 such that the actual valve timing of the intake valve (or an actual VCT phase) coincides with target valve timing (target VCT phase) determined in accordance with an engine operational state. In other words, the engine control circuit 21 controls oil pressure based on feed-back control such that the actual valve timing of the intake valve coincides with the target valve timing.

Figure 2:
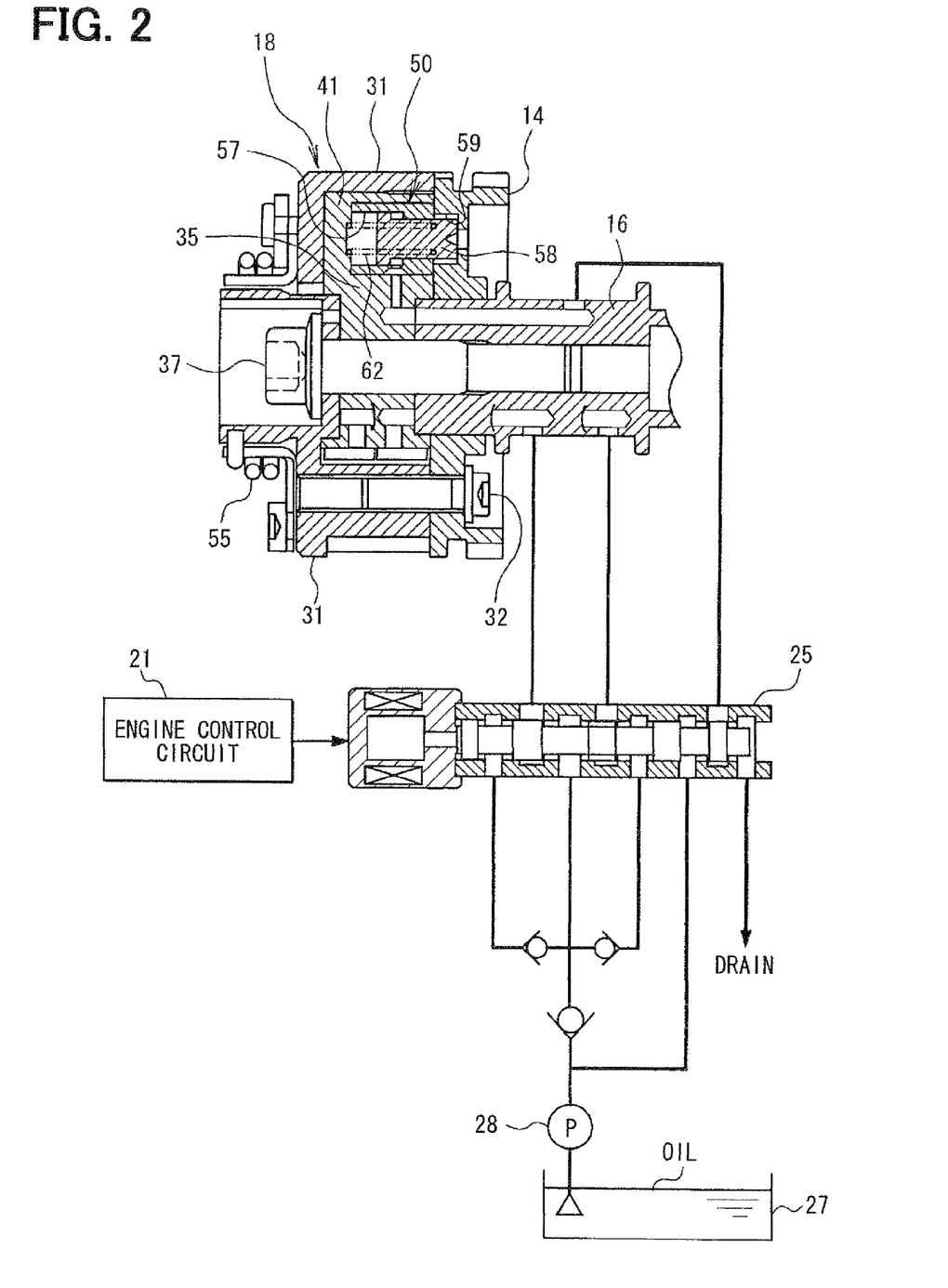
FIG. 2 is a sectional view of a variable valve timing unit and a hydraulic control circuit taken along a longitudinal axis thereof.

Next, the variable valve timing unit 18 will be described with reference to FIGS. 2 and 3.

The variable valve timing unit 18 has a housing 31 that is fixed to the sprocket 14 through a bolt 32. The sprocket 14 is movably supported at a position radially outward of the intake camshaft 16. Thus, when the rotation of the crankshaft 12 is transmitted to the sprocket 14 and the housing 31 through the timing chain 13, the sprocket 14 and the housing 31 are rotated synchronously with the crankshaft 12.

The intake camshaft 16 has one end portion that is fixed to a rotor 35 through a bolt 37. The rotor 35 is received within the housing 31 and is rotatable relative to the housing 31.

Figure 3:
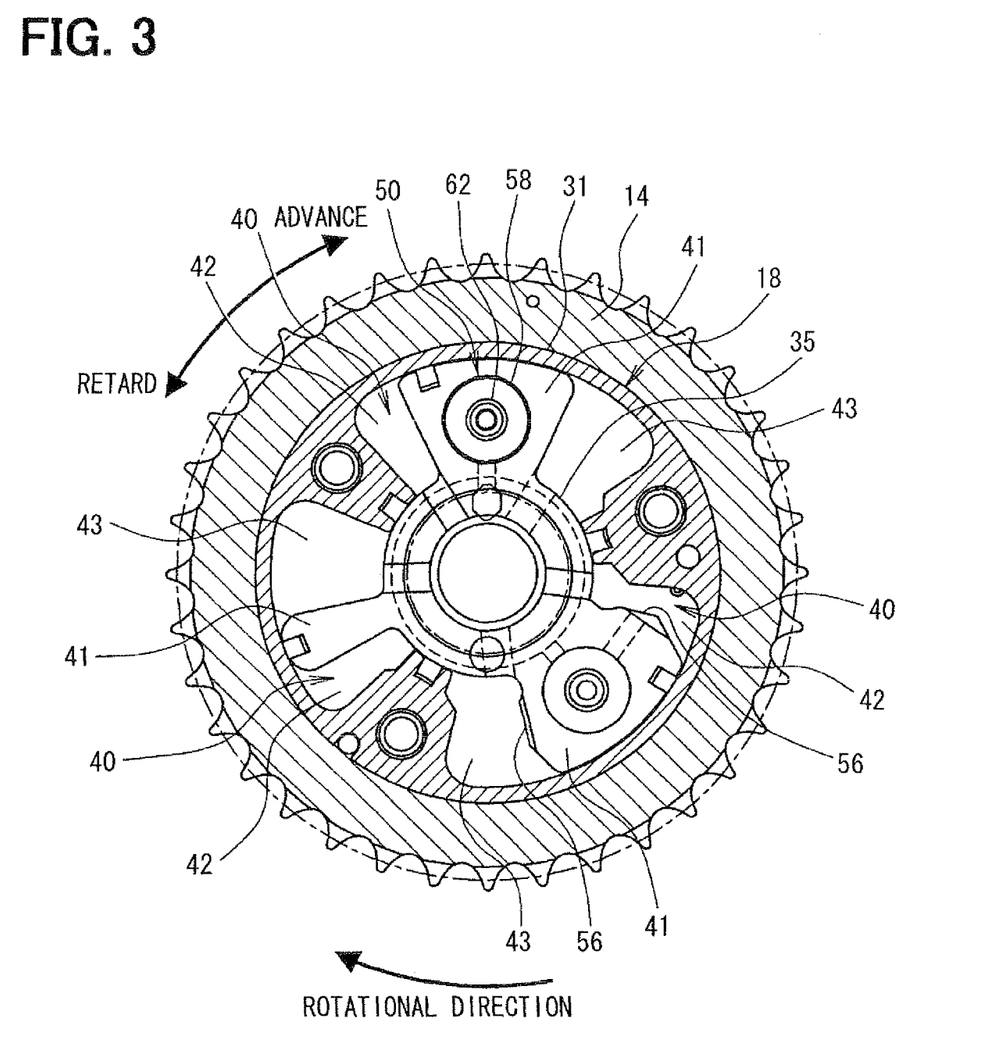
FIG. 3 is a sectional view of the variable valve timing unit taken along a plane perpendicular to a rotational axis of the variable valve timing unit.

As shown in FIG. 3, multiple vane receiving chambers 40 are formed within the housing 31, and vanes 41 are formed at radially outward parts of the rotor 35. Each of the vane receiving chambers 40 is divided into an advance chamber 42 and a retard chamber 43 by the corresponding vane 41. At least one of the vanes 41 has both circumferential ends that are provided with respective stoppers 56. Each of the stoppers 56 limits a rotational range of the rotor 35 (the vane 41) relative to the housing 31. The stoppers 56 defines a full retard position and a full advance position of an adjustable range of the actual VCT phase (camshaft phase).

The variable valve timing unit 18 is provided with an intermediate lock mechanism 50 that is adapted to lock the VCT phase at an intermediate lock position. For example, the intermediate lock position corresponds to a position or a phase between the full advance position and the full retard position (for example, a generally middle position) of the above adjustable range of the VCT phase. The intermediate lock mechanism 50 will be described below. A lock pin receiving hole 57 is provided to one of the multiple vanes 41. Alternatively, multiple lock pin receiving holes 57 may be provided to the multiple vanes 41, respectively. The lock pin receiving hole 57 receives therein a lock pin 58 that is displaceable to project from the lock pin receiving hole 57. The lock pin 58 locks the rotation of the rotor 35 (the vane 41) relative to the housing 31 when the lock pin 58 projects from the lock pin receiving hole 57 toward the sprocket 14 to be inserted into a lock hole 59 of the sprocket 14. As a result, the VCT phase is locked at the intermediate lock position located generally in the middle of the adjustable range. The intermediate lock position is set at a phase that is suitable for starting the engine 11. It should be noted that the lock hole 59 may be alternatively provided to the housing 31.

The lock pin 58 is urged by a spring 62 (urging means) in a lock direction for locking the VCT phase. In other words, the lock pin 58 is urged in a projection direction, in which the lock pin 58 is capable of projecting from the lock pin receiving hole 57. Also, a hydraulic chamber (lock release hydraulic chamber) for releasing the lock is formed between (a) the radially outward part of the lock pin 58 and (b) the lock pin receiving hole 57. The hydraulic chamber is used to control oil pressure that actuates the lock pin 58 in a lock release direction for unlock the rotation of the rotor 35 to release the locked VCT phase. For example, when the pressure in the hydraulic chamber becomes high, the pressure urges the lock pin 58 in the lock release direction such that the lock pin 58 is displaced in the lock release direction against the urging force of the spring 62. Also, when the pressure in the hydraulic chamber becomes low, or is released, the pressure does not urge the lock pin 58 substantially. As a result, the lock pin 58 is urged only in the lock direction by the urging force of the spring 62, and thereby the lock pin 58 is displaced in the lock direction. In the present specification, the operation of urging the lock pin 58 in the lock direction indicates the state, where the pressure in the hydraulic chamber becomes low, and thereby the lock pin 58 is allowed to be displaced in the lock direction as described above.

It should be noted that the housing 31 is provided with a spring 55 (see FIG. 2) that provides spring force for assisting oil pressure applied to rotate the rotor 35 relatively in an advance direction during en advance control. The spring 55 may be a helical torsion spring and serves as urging means. In the variable valve timing unit 18 of the intake valve, torque of the intake camshaft 16 is applied in a direction for shifting the VCT phase in a retard direction. The above means that the spring 55 urges the rotor 35 to shift the VCT phase in the advance direction that is opposite from the direction of torque applied to the intake camshaft 16.

Figure 5:
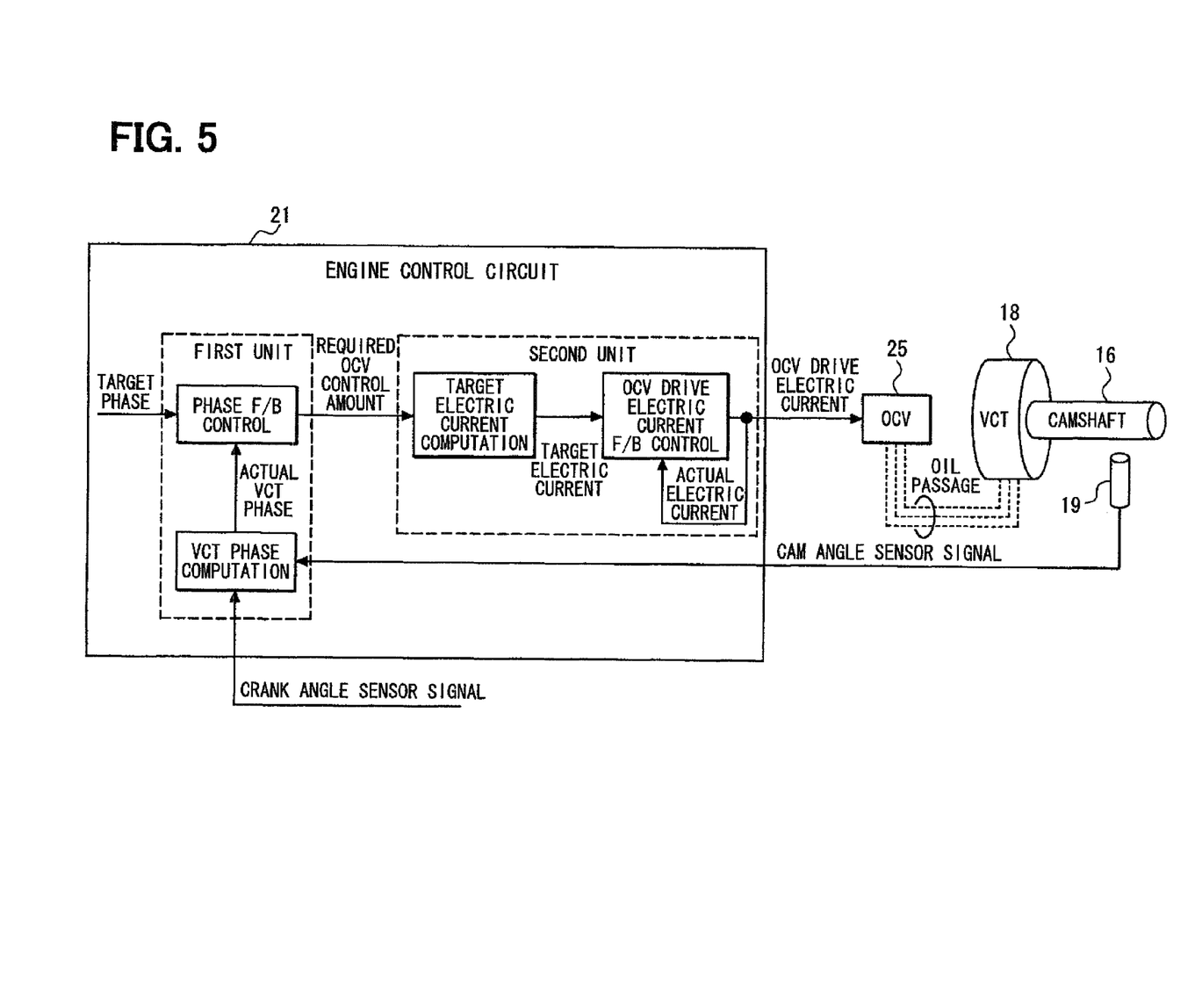
FIG. 5 is a block diagram for illustrating functions of an engine control circuit.

In the first embodiment, as shown in FIG. 5, it is designed such that the force of the spring 55 is applied to the rotor 35 in the advance direction when the VCT phase stays within a range from the full retard position to a position immediately before the intermediate lock position. For example, the spring 55 is designed to work for a fail-safe operation during restarting the engine 11 after the engine 11 has abnormally stopped, such as an engine stall. More specifically, when the engine is started in a state, where the actual VCT phase is on a retard side of the intermediate lock position while the lock pin 58 is not fitted with the lock pin receiving hole 57, the spring force of the spring 55 assists an advance operation, in which the actual VCT phase is advanced from the retard side toward the intermediate lock position such that the lock pin 58 is fitted into the lock pin receiving hole 57 in order to lock the VCT phase, during the cranking by a starter (not shown).

In contrast, when the engine is started in another state, where the actual VCT phase is on an advance side of the intermediate lock position, torque of the intake camshaft 16 is applied in the retard direction during the cranking. As a result, the torque of the intake camshaft 16 retards the actual VCT phase from the advance side toward the intermediate lock position such that the lock pin 58 is engaged with the lock pin receiving hole 57 for locking the VCT phase.

Figure 4A:
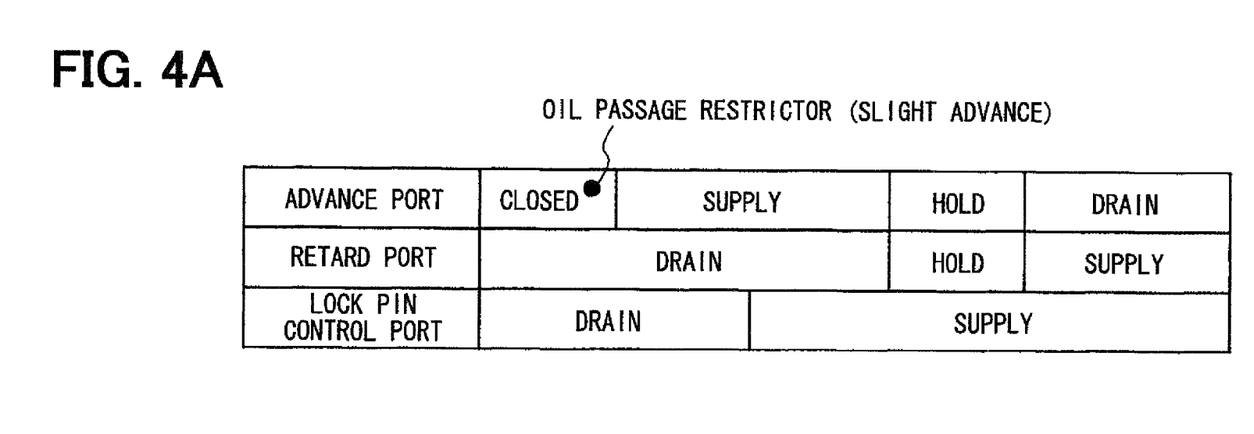
FIG. 4A is a diagram for explaining a pattern for switching between an advance port, a retard port, and a lock pin control port of a hydraulic control valve.
Figure 4B:
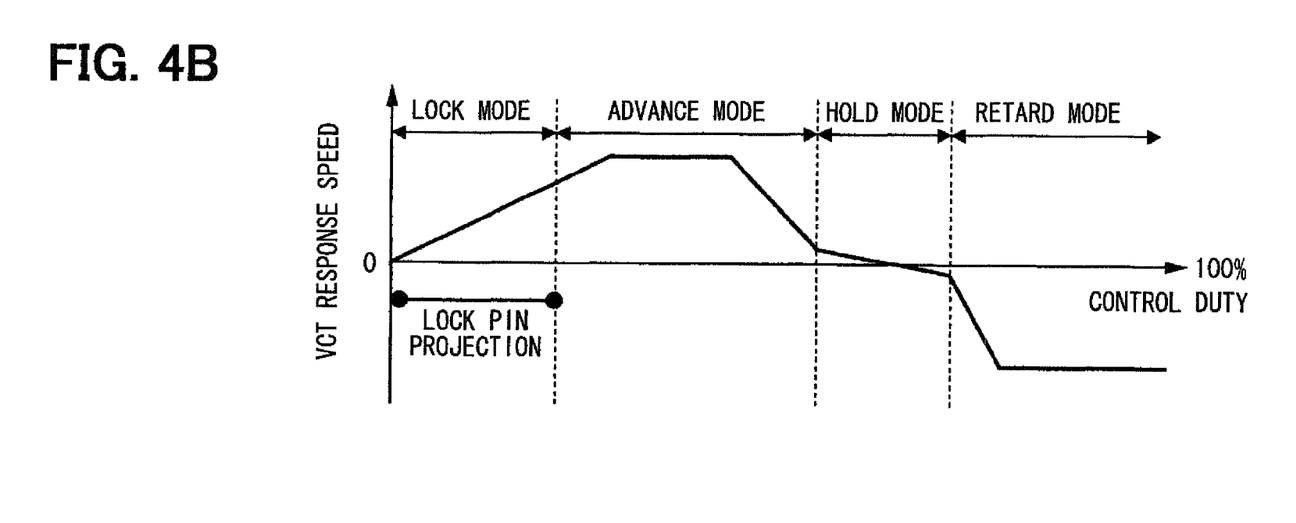
FIG. 4B is a control characteristic diagram of the hydraulic control valve for illustrating a relation between (a) a VCT response speed and (b) four control ranges (a lock mode, an advance operation mode, a hold mode, and a retard operation mode)

Also, in the first embodiment, a hydraulic control valve (or oil control valve: OCV) 25 controls oil pressure that actuates the VCT phase and the lock pin 58 of the variable valve timing unit 18. The OCV 25 of the present embodiment includes a single hydraulic control valve that is structured to function as a phase-control hydraulic control valve and as a lock-control hydraulic control valve. For example, the phase-control hydraulic control valve controls oil pressure that actuates the VCT phase, and the lock-control hydraulic control valve controls oil pressure that actuates the lock pin 58. An oil pump 28 is driven by drive force of the engine 11 and pumps oil (hydraulic oil) in an oil pan 27 to supply the oil to the OCV 25. The above OCV 25 is, for example, an eight-port and four-position spool valve. As shown in FIGS. 4A and 4B, the OCV 25 is operated under four control ranges based on a control duty (VCT control amount) of the OCV 25. The control ranges correspond to a lock mode (slight advance operation mode), an advance operation mode, a hold mode, and a retard operation mode, for example.

When the control range corresponds to the lock mode (slight advance operation mode), a lock pin control port of the OCV 25 is brought into communication with the drain port such that oil pressure in the lock release hydraulic chamber within the lock pin receiving hole 57 is released, and thereby the spring 62 is allowed to displace the lock pin 58 in the lock direction (projection direction) without the counter force of the oil pressure that otherwise prevents the displacement of the lock pin 58 in the lock direction. Also, a retard port of the OCV 25 is brought into communication with the drain port such that oil pressure in the retard chambers 43 are released. In the above communication state, an operational state of a restrictor in an oil passage connected with an advance port of the OCV 25 is slowly changed in accordance with the control duty of the OCV 25 such that oil is slowly supplied to the advance chambers 42 through the advance port. As a result, the actual VCT phase is gently shifted in the advance direction.

When the control range corresponds to the advance operation mode, the retard port of the OCV 25 is brought into communication with the drain port such that oil pressure in the retard chamber 43 is released. In the above operation state, oil pressure supplied to the advance chambers 42 through the advance port of the OCV 25 is changed in accordance with the control duty of the OCV 25. As a result, the actual VCT phase is shifted in the advance direction.

When the control range corresponds to the hold mode, oil pressure in both the advance chamber 42 and the retard chamber 43 are maintained such that the actual VCT phase is prevented from being shifted.

When the control range corresponds to the retard operation mode, the advance port of the OCV 25 is brought into communication with the drain port such that oil pressures in the advance chambers 42 are released. In the above operation state, oil pressure supplied to the retard chambers 43 through the retard port of the OCV 25 is changed in accordance with the control duty of the OCV 25 such that the actual VCT phase is shifted in the retard direction.

When the control range corresponds to the control mode other than the lock mode (such as the retard operation mode, the hold mode, the advance operation mode), the lock release hydraulic chamber within the lock pin receiving hole 57 is filled with oil in order to increase oil pressure in the lock release hydraulic chamber. As a result, the increased pressure of oil pulls the lock pin 58 out of the lock hole 59 such that the lock of the lock pin 58 is released. In other words, the increased oil pressure disengages the lock pin 58 from the lock hole 59 such that the lock of the VCT phase by the lock pin 58 is released.

It should be noted that in the first embodiment, the control mode is changed in the order from the lock mode (slight advance operation mode), the advance operation mode, the hold mode, to the retard operation mode in accordance of the increase of the control duty of the OCV 25. However, for example, the control mode may be alternatively changed in the order of the retard operation mode, the hold mode, the advance operation mode, and the lock mode (slight advance operation mode) in accordance with the increase of the control duty of the OCV 25. Further alternatively, the control mode may be changed in the other order of the lock mode (slight advance operation mode), the retard operation mode, the hold mode, and the advance operation mode. Also, in a case, where the control range of the lock mode (slight advance operation mode) is directly adjacent to the control range of the retard operation mode, the operation of the OCV 25 in the control range for the lock mode (slight advance operation mode) may be executed as follows. For example, in the lock mode, oil pressure in the lock release hydraulic chamber within the lock pin receiving hole 57 is released, and thereby the spring 62 is allowed to displace the lock pin 58 in the lock direction. Simultaneously, the advance port is brought into communication with the drain port such that oil pressure is the advance chamber 42 is released. In the above operation condition, an operational state of the restrictor of the oil passage connected with the retard port is slowly changed in accordance with the control duty of the OCV 25 such that oil is slowly supplied to the retard chambers 43 through the retard port. As a result, the actual VCT phase is gently shifted in the retard direction.

The engine control circuit 21 serves as control means and computes the target phase (target valve timing) based on the engine operational condition during the phase feed-back control. Then, the control duty (OCV control amount) of the OCV 25 is controlled based on feed-back control through, for example, a PID control or a PI control, such that oil pressure supplied to the advance chambers 42 and the retard chambers 43 of the variable valve timing unit 18 is controlled based on feed-back control in order to cause the actual VCT phase of the intake camshaft 16 (actual valve timing of the intake valve) to coincide with the target phase (target valve timing). A control range of the phase feed-back control extends over the control range of the retard operation mode, the control range of the hold mode, and the control range of the advance operation mode.

Furthermore, the engine control circuit 21 shifts the VCT phase to temporarily pass over the intermediate lock position to a position that is displaced from the intermediate lock position by a predetermined amount when a lock request is generated during the stopping of the rotation of the engine 11 or during a stand-by operation. Then, the engine control circuit 21 executes a lock pin projection control while the engine control circuit 21 shifts the VCT phase back to the intermediate lock position. In the lock pin projection control, the engine control circuit 21 reduces oil pressure in the lock release hydraulic chamber within the lock pin receiving hole 57 such that the spring 62 urges the lock pin 58 in the lock direction or in the projection direction. As a result, when the actual VCT phase reaches the intermediate lock position, the lock pin 58 is displaced in the lock direction to be fitted into the lock hole 59 such that the actual VCT phase is locked at the intermediate lock position.

Also, the engine control circuit 21 is configured to start the engine by setting the VCT phase at the intermediate lock position. A lock release request is generated when oil pressure is increased to an appropriate oil pressure due to increase in the engine rotation or in oil pump rotation after the completion of the start of the engine, and thereby the engine control circuit 21 actuates the lock pin 58 in the lock release direction or in the retraction direction against the urging force of the spring 62 by supplying oil pressure to the lock release hydraulic chamber within the lock pin receiving hole 57. Thus, the lock pin 58 is displaced out of the lock hole 59 in the lock release direction such that the lock of the VCT phase is released (lock release is executed). After the lock release, a control state is changed to a phase feed-back control, where a control duty (OCV control amount or valve control amount) of the OCV 25 is feed-back controlled through, for example, the PID control or the PI control such that the actual VCT phase is caused to coincide with the target phase that is determined based on the engine operational condition.

As shown in FIG. 5, the engine control circuit 21 has a first unit (first means) for executing a phase feed-back control and a second unit (second means) for executing an electric current feed-back control. In the phase feed-back control, a required OCV control amount (or required valve control amount) is computed based on a difference between the actual VCT phase and the target phase. In the electric current feed-back control, a target electric current is computed based on the required OCV control amount in order to feed-back control an OCV drive electric current (an output electric current or a valve drive electric current of the engine control circuit 21) to coincide with the target electric current. The electric current feed-back control is executed at intervals shorter than intervals, at which the phase feed-back control is executed. The actual VCT phase is computed based on timing of signals outputted by the cam angle sensor 19 and based on timing of signals outputted by the crank angle sensor 20. As a result, the phase feed-back control is executed at relatively long intervals such that the VCT phase is computable. Also, the actual value of the OCV drive electric current in the electric current feed-back control of the second unit is detectable at intervals shorter than intervals, at which the actual value of the VCT phase in the phase feed-back control of the first unit is detectable. As a result, it is possible to execute the electric current feed-back control at intervals shorter than the intervals, at which the phase feed-back control is executed.

Figure 6:
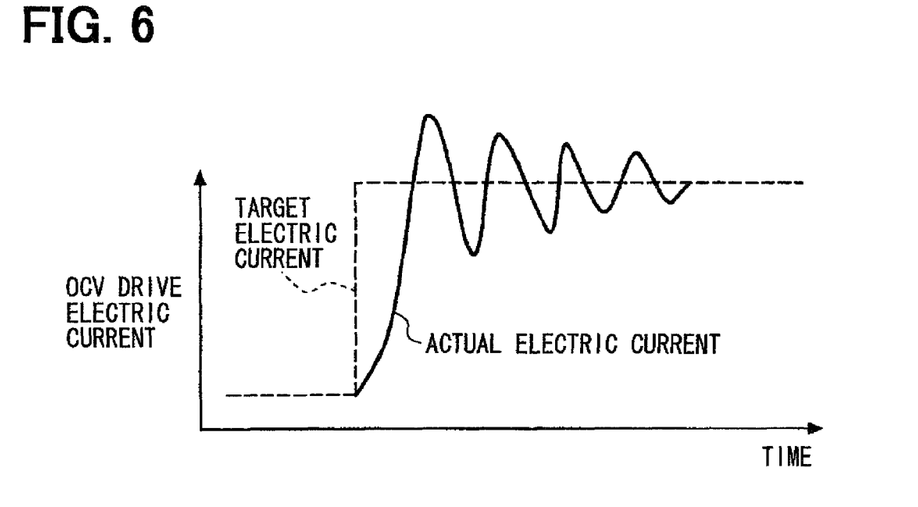
FIG. 6 is a timing chart illustrating a response characteristic of an actual OCV drive electric current when an electric current feed-back control is executed under a high gain operation (small time constant)

For example, a response speed in the electric current feed-back control is increased with an increase of a feed-back gain (for example, integral gain) of the electric current feed-back control. In other words, a time constant is reduced with the increase of the feed-back gain of the electric current feed-back control. Thus, when the feed-back gain of the electric current feed-back control is high, an actual OCV drive electric current quickly changes to follow the change of the target electric current as shown in FIG. 6. However, an overshoot or a hunting may occur, and thereby, a convergent performance to a target electric current may deteriorate.

Figure 7:
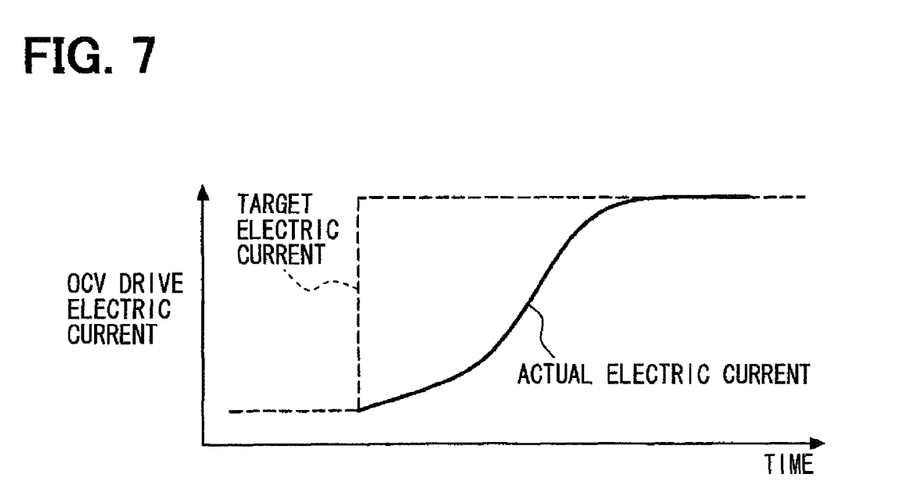
FIG. 7 is another timing chart illustrating the response characteristic of the actual OCV drive electric current when the electric current feed-back control is executed under a low gain operation (large time constant)

In contrast, the response speed of the electric current feed-back control is reduced with the reduction of the feed-back gain (for example, integral gain) of the electric current feed-back control. In other words, the time constant is increased with the reduction of the feed-back gain of the electric current feed-back control. Thus, when the feed-back gain of the electric current feed-back control is low, the actual OCV drive electric current changes slowly relative to the change of the target electric current as shown in FIG. 7. As a result, the overshoot and the hunting are not likely to occur, and thereby the convergent performance to the target electric current is effectively improved. Thereby, the accuracy and reliability of the control are effectively improved.

In a phase feed-back control, the VCT phase is feed-back controlled to the target phase. When the VCT phase is operated under the phase feed-back control, the control range for the phase feed-back control ranges from the control range of the retard operation mode to the control range of the advance operation mode (see FIG. 4B), and the control range for the phase feed-back control is referred to as a "phase control range" in the present embodiment. In order to achieve the accuracy and reliability of the phase control, the feed-back gain (time constant) of the electric current feed-back control is set within a certain range such that the overshoot and the hunting are prevented as shown in FIG. 7. In contrast, when the control duty corresponds to the control range for the lock mode, high responsivity in a lock operation and a lock release operation of the lock pin 58 is required rather than the accuracy and reliability of the control. As a result, if the lock pin 58 is actuated with the feed-back gain (time constant), which is suitable for the phase feed-back control, during the lock operation or the lock release operation, it is impossible to satisfy the high responsivity required for the lock operation and the lock release operation, for example.

In view of the above, the engine control circuit 21 sets the feed-back gain (time constant) of the electric current feed-back control to a value within the certain range in the operation under the phase control range (first control range) in order to achieve the accuracy and reliability of the phase control such that the overshoot and the hunting are prevented in the execution of the electric current feed-back control as shown in FIG. 7. Also, in the operation under the lock pin control range (second control range), the engine control circuit 21 sets the feed-back gain of the electric current feed-back control to a value higher than the value used in the operation under the phase control range as shown in FIG. 6. Then, the engine control circuit 21 executes the electric current feed-back control with the highly set feed-back gain as above. In other words, in the operation under the lock pin control range, the engine control circuit 21 reduces the time constant for the electric current feed-back control. Due to the above configuration, the VCT control of the present embodiment is capable of simultaneously satisfying both of (a) the accuracy and reliability of the phase control in the operation under the phase control range, and (b) the high responsivity in the lock operation and the lock release operation of the lock pin 58 in the operation under the lock pin control range.

As above, in the phase control range (first control range), the OCV drive electric current (valve drive electric current) is feed-back controlled based on the first control characteristic (low feed-back gain, first time constant). Also, in the lock pin control range (second control range), the OCV drive electric current is feed-back controlled based on the second control characteristic (high feed-back gain, second time constant). Thus, it is possible to appropriately set the response speed (time constant) of the OCV drive electric current control for each control range in accordance with the characteristic of the control range. As a result, it is possible to achieve both of (a) the accuracy and reliability of the phase control and (b) the high responsivity in the lock pin control.

Figure 8:
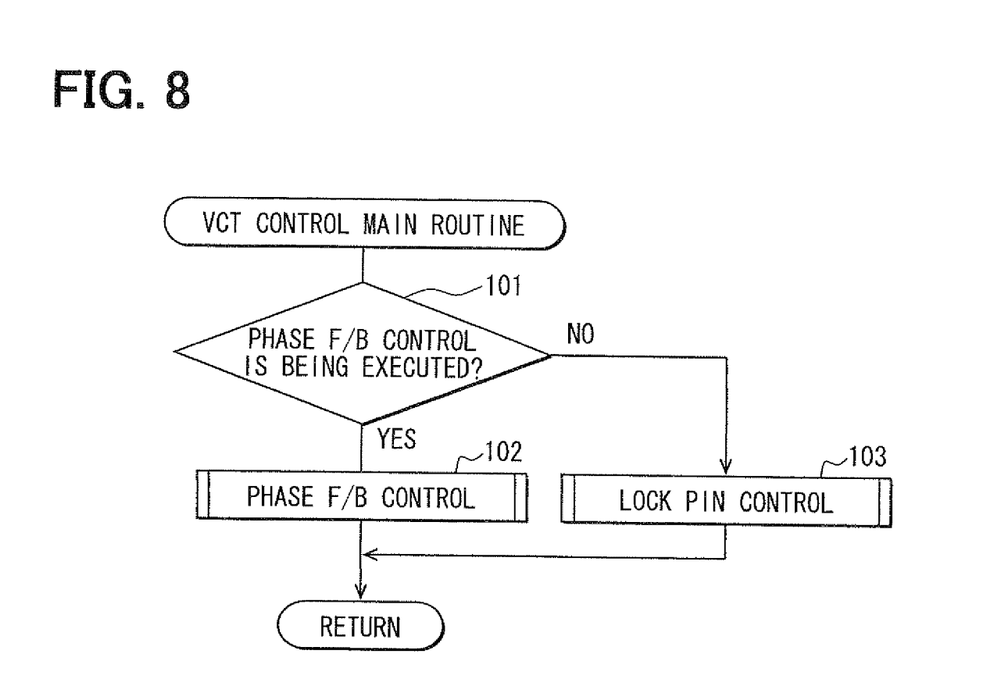
FIG. 8 is a flow chart for explaining a procedure of a VCT control main routine according to the first embodiment of the present invention.
Figure 9:
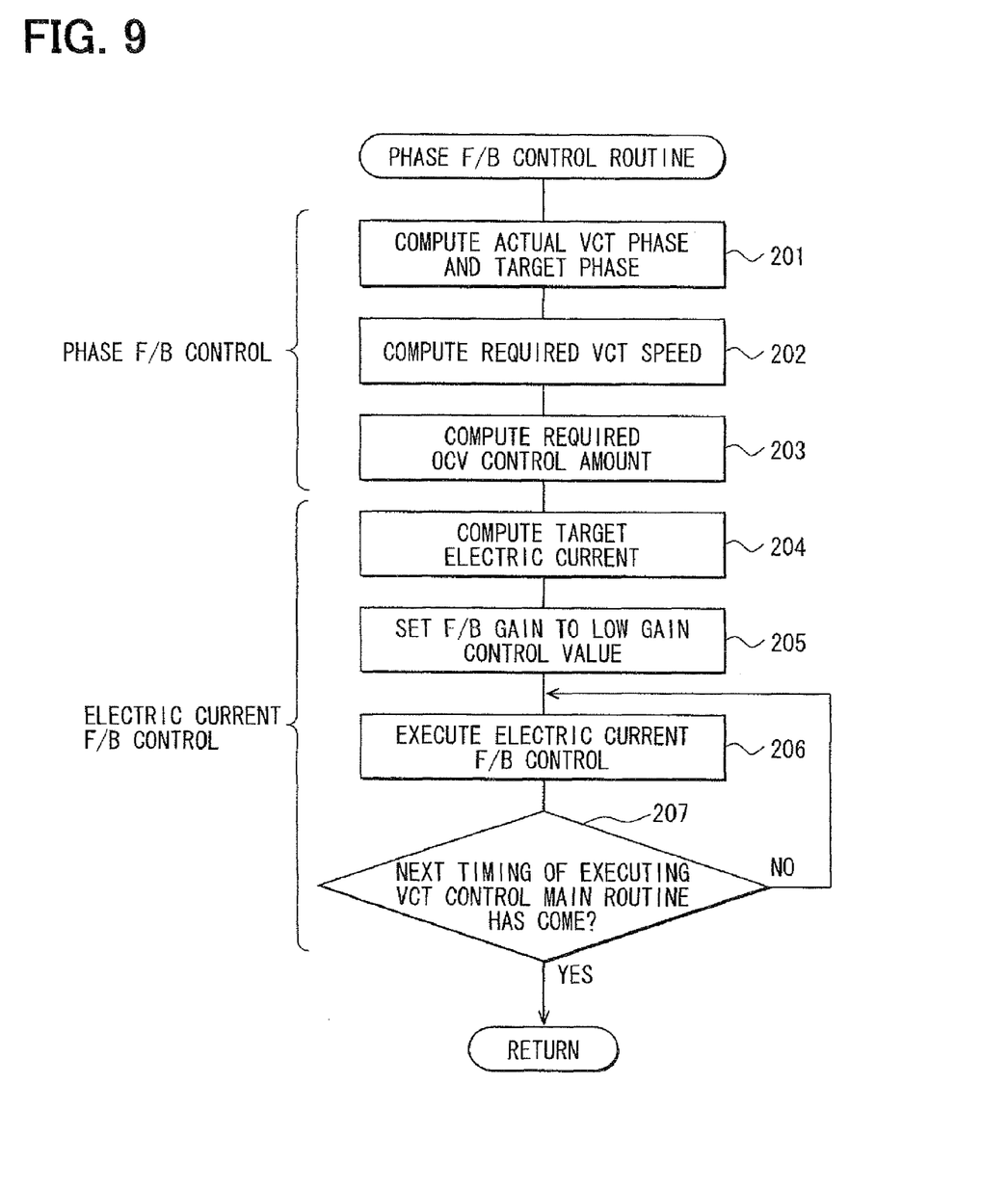
FIG. 9 is a flow chart for explaining a procedure of a phase feed-back control routine according to the first embodiment.
Figure 10:
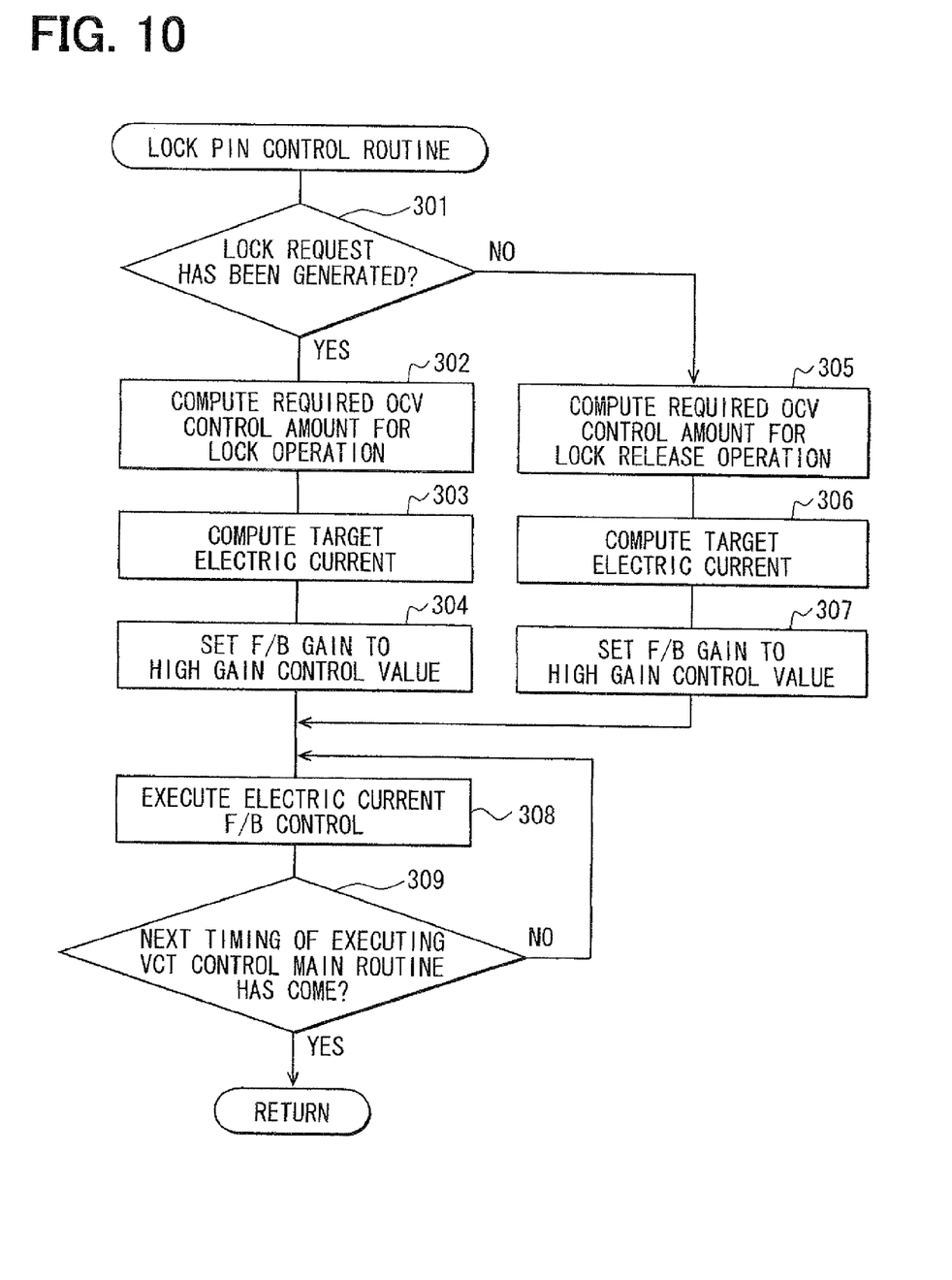
FIG. 10 is a flow chart for explaining a procedure of a lock pin control routine according to the first embodiment.

The VCT control of the first embodiment is executed by the engine control circuit 21 based on the routines shown in FIGS. 8 to 10. The procedure of each routine will be described below.

[VCT Control Main Routine]

The VCT control main routine shown in FIG. 8 is repeatedly executed during the engine operation at predetermined intervals, and serves as control means. When the present routine is started, firstly, control proceeds to step 101, where it is determined whether the phase feed-back control is being executed. When it is determined that the phase feed-back control is being executed, control proceeds to step 102, where a phase feed-back control routine shown in FIG. 9 is executed. When it is determined at step 101 that the lock pin control is being executed instead, control proceeds to step 103, where a lock pin control routine shown in FIG. 10 is executed.

[Phase Feed-Back Control Routine]

The phase feed-back control routine in FIG. 9 is a subroutine executed at step 102 of the VCT control main routine in FIG. 8. When the present routine is started, firstly, control proceeds to step 201, where the actual VCT phase is computed based on timing of the signals outputted by the cam angle sensor 19 and based on timing of the signals outputted by the crank angle sensor 20. Also, the target phase is computed by using a map based on the engine operational state.

Then, control proceeds to step 202, where a required VCT speed is computed by using a map based on a difference between the actual VCT phase and the target phase, and control proceeds to step 203, where a required OCV control amount is computed by using a map based on the required VCT speed. Then, control proceeds to step 204, where a target electric current is computed by using a map based on the required OCV control amount, and control proceeds to step 205, where the feed-back gain (for example, integral gain) of the electric current feed-back control is set to a control value for the low gain operation (or a control value for increasing the time constant). The control value for the low gain operation is set to a value in order to achieve the accuracy and reliability of the electric current feed-back control rather than the responsivity of the control. More specifically, the control value for the low gain operation is set around an upper limit value of the certain range that causes the prevention of the overshoot and the hunting.

Subsequently, control proceeds to step 206, where the electric current feed-back control is executed in order to cause the OCV drive electric current (the output electric current of the engine control circuit 21) to coincide with the target electric current. The electric current feed-back control is executed at intervals shorter than the intervals, at which the phase feed-back control is executed. In order to cause the OCV drive electric current to coincide with the target electric current, the electric current feed-back control is repeatedly executed at step 207 until the next timing of executing the VCT control main routine of FIG. 8 comes. When the next timing of executing the VCT control main routine of FIG. 8 comes, the present routine of FIG. 9 is ended.

[Lock Pin Control Routine]

The lock pin control routine of FIG. 10 is a subroutine executed at step 103 in the VCT control main routine of FIG. 8. When the present routine is started, firstly, control proceeds to step 301, where it is determined whether the lock request has been generated (or whether the lock release request has not been generated). When it is determined that the lock request has been generated, control proceeds to step 302, where the required OCV control amount for the lock operation is computed by using a map. Subsequently, control proceeds to step 303, where the target electric current is computed by using a map based on the required OCV control amount for the lock operation. Then, control proceeds to step 304, where the feed-back gain (for example, integral gain) of the electric current feed-back control is set to a control value for the high gain operation (or a control value for reducing the time constant). In the above, the control value for the high gain operation is determined in order to achieve the responsivity of the electric current feed-back control rather than the accuracy and the reliability of the control. More specifically, the control value for the high gain operation is set to a value greater than the value of the feed-back gain of the electric current feed-back control used in the operation under the phase feed-back control.

Then, control proceeds to step 308, where the electric current feed-back control is executed in order to cause the OCV drive electric current (the output electric current of the engine control circuit 21) to coincide with the target electric current. The above execution is repeated at step 309 until the next timing of executing the VCT control main routine of FIG. 8 comes. When the next timing of executing the VCT control main routine of FIG. 8 comes, the present routine of FIG. 10 is ended.

In contrast, when it is determined at step 301 that the lock request has not been generated (or the lock release request has been generated), control proceeds to step 305, where the required OCV control amount for the lock release operation (for example, hold duty) is computed. Subsequently, control proceeds to step 306, where the target electric current is computed by using a map based on the required OCV control amount for the lock release operation. Then, control proceeds to step 307, where the feed-back gain (for example, integral gain) of the electric current feed-back control is set to a control value for the high gain operation (or a control value for reducing the time constant). In the above, the control value for the high gain operation is set in order to achieve the responsivity in the electric current feed-back control rather than the accuracy and reliability in the control. Thus, the control value for the high gain operation is greater than the control value for the feed-back gain for the electric current feed-back control during the phase feed-back control.

Subsequently, control proceeds to step 308, where the electric current feed-back control is executed in order to cause the OCV drive electric current (the output electric current of the engine control circuit 21) to coincide with the target electric current. The above execution of the electric current feed-back control is repeated at step 309 until the next timing of executing the VCT control main routine of FIG. 8 comes. When the next timing of executing the VCT control main routine of FIG. 8 comes, the present routine of FIG. 10 is ended.

According to the first embodiment, in the operation under the phase control range, in order to achieve the accuracy and reliability of the phase control, the feed-back gain (time constant) of the electric current feed-back control is set within a certain range that causes the prevention of the overshoot and the hunting. The feed-back gain of the electric current feed-back control in the operation under the lock pin control range is increased compared with the feed-back gain of the electric current feed-back control in the operation under the phase control range. In other words, the time constant in the operation under the lock pin control range is made smaller than the time constant used in the operation under the phase control range. Then, in the above operational state, the electric current feed-back control is executed. As a result, the accuracy and reliability of the phase control in the operation under the phase control range is achieved, and simultaneously the high responsivity in the lock operation and the lock release operation of the lock pin 58 in the operation under the lock pin control range is achieved.

Second Embodiment

Next, the second embodiment of the present invention will be described with reference to FIG. 11. Similar components of the present embodiment, which are similar to the components of the first embodiment, will be designated by the same numerals, and the explanation thereof will be omitted. The parts different from the first embodiment will be mainly described.

In the first embodiment, the feed-back gain of the electric current feed-back control in the operation under the lock pin control range is increased compared with the feed-back gain in the operation under the phase control range in order to execute the electric current feed-back control. In other words, the time constant in the operation under the lock pin control range is reduced compared with the time constant in the operation under the phase control range in order to execute the electric current feed-back control. As a result, the high responsivity in the lock operation and the lock release operation of the lock pin 58 is achieved. In the second embodiment of the present invention, during the execution of the lock pin control, the lock pin control routine in FIG. 11 is executed such that the OCV drive electric current is controlled based on open-loop control in the operation under the lock pin control range. As a result, the high responsivity in the lock operation and the lock release operation of the lock pin 58 is achieved.

In general, the accuracy in the open-loop control is lower that the accuracy in the feed-back control. However, the lock operation and the lock release operation of the lock pin 58 does not require the accuracy and reliability of the control required in the phase feed-back control. Thus, there is no harm when the high responsivity is achieved by the open-loop control.

Similar to the first embodiment, in the second embodiment, the engine control circuit 21 executes the VCT control main routine of FIG. 8 at predetermined intervals. When it is determined at step 101 that the phase feed-back control is being executed, the phase feed-back control routine in FIG. 9 is executed similarly to the first embodiment. When it is determined that the lock pin control is being executed, the lock pin control routine in FIG. 11 is executed.

Figure 11:
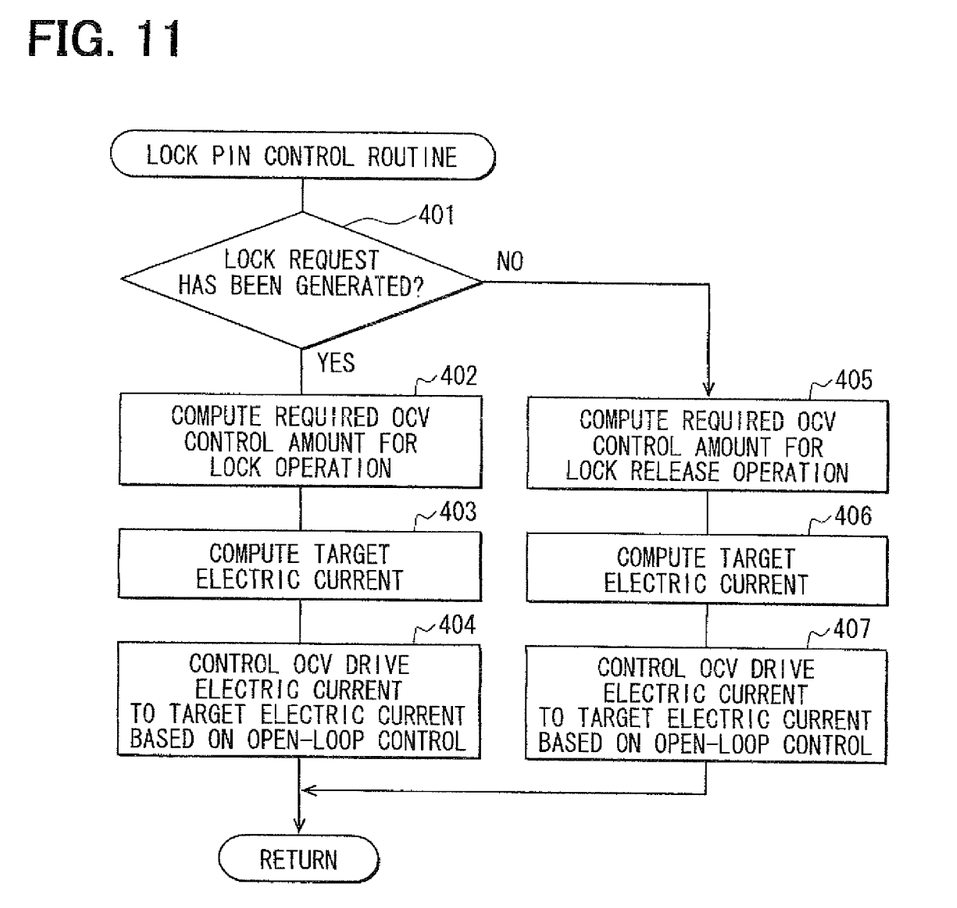
FIG. 11 is a flow chart for explaining a procedure of a lock pin control routine according to the second embodiment of the present invention.

When the lock pin control routine in FIG. 11 is started, firstly, at step 401, it is determined whether the lock request has been generated (or whether the lock release request has not been generated). When it is determined that the lock request has been generated, control proceeds to step 402, where the required OCV control amount for the lock operation is computed by using a map. Subsequently, control proceeds to step 403, where target electric current is computed by using a map based on the required OCV control amount for the lock operation. Then, control proceeds to step 404, where the operational state is switched from the electric current feed-back control to the open-loop control, and the engine control circuit 21 outputs the OCV drive electric current to the OCV 25 in accordance with the target electric current. Then, the present routine is ended.

In contrast, when it is determined step 401 that the lock request has not been generated (or the lock release request has been generated), control proceeds to step 405, where the required OCV control amount for the lock release operation (for example, hold duty) is computed. Subsequently, control proceeds to step 406, where the target electric current is computed by using a map based on the required OCV control amount for the lock release operation. Then, control proceeds to step 407, where the operational state is switched from the electric current feed-back control to the open-loop control, and the engine control circuit 21 outputs the OCV drive electric current to the OCV 25 in accordance with the target electric current. Then, the present routine is ended.

According to the second embodiment, in the operation under the lock pin control range, the OCV drive electric current is controlled based on the open-loop control. As a result, similar to the first embodiment, the accuracy and reliability of the phase control in the operation under the phase control range is effectively achieved, and simultaneously the high responsivity the lock operation and the lock release operation of the lock pin 58 in the operation under the lock pin control range is effectively achieved.

Note that, the present invention is embodied as the variable valve timing unit of the intake valve in the above first and the second embodiments. However, the present invention may be alternatively applicable to a variable valve timing unit of the exhaust valve. In the alternative case, where the present invention is applied to the variable valve timing unit of the exhaust valve, a direction of controlling the VCT phase of the exhaust valve may be alternatively set opposite from the direction of controlling the VCT phase of the intake valve in the above embodiment. In other words, a directional relation between "timing advance" and "timing retard" in the above embodiment may be reversed in the alternative embodiment for the exhaust valve.

The present invention may be modified in a various manner provided that the modification does not deviate from the gist of the present invention. For example, a configuration of the variable valve timing unit and a configuration of the hydraulic control valve may be modified as required.

Additional advantages and modifications will readily occur to those skilled in the art. The invention in its broader terms is therefore not limited to the specific details, representative apparatus, and illustrative examples shown and described.

What is claimed is:

1. A variable valve timing controller for an internal combustion engine having a crankshaft and a camshaft, the variable valve timing controller comprising:

a hydraulic variable valve timing unit configured to adjust valve timing by changing a variable cam timing (VCT) phase that is a rotational phase of the camshaft relative to the crankshaft;

a lock pin configured to lock the VCT phase at an intermediate lock position located within an adjustable range of the VCT phase;

one single hydraulic control valve configured to control oil pressure that actuates the variable valve timing unit and the lock pin; and control means for controlling a valve drive electric current that is used for actuating the single hydraulic control valve, wherein:

the control means operates the single hydraulic control valve under a plurality of control ranges;

the control means controls the valve drive electric current to actuate the single hydraulic control valve based on a first control characteristic in the operation of the single hydraulic control valve under a first one of the plurality of control ranges;

the control means controls the valve drive electric current to actuate the single hydraulic control valve based on a second control characteristic in the operation of the single hydraulic control valve under a second one of the plurality of control ranges;

the first control characteristic is different from the second control characteristic;

the first one of the plurality of control ranges is a phase control range, in which the single hydraulic control valve is operated to cause the VCT phase to coincide with a target phase that is determined in accordance with an operational condition;

the second one of the plurality of control ranges is a lock pin control range, in which the single hydraulic control valve is operated to actuate the lock pin in a lock direction for locking the VCT phase and in a lock release direction for releasing the lock of the VCT phase;

the control means controls the second control characteristic under the lock pin control range to have higher responsivity than the first control characteristic under the phase control range;

the control means includes:

first means for executing a phase feed-back control, in which a required valve control amount is computed based on a difference between the VCT phase and a target phase; and second means for executing an electric current feed-back control, in which a target electric current is computed based on the required valve control amount, and in which the valve drive electric current is controlled based on feed-back control such that the valve drive electric current coincides with the target electric current; and the control characteristic of the electric current feed-back control in the lock pin control range is set to be faster than the control characteristic of the electric current feed-back control in the phase control range.

2. The variable valve timing controller according to claim 1, wherein:

the control means controls the valve drive electric current based on feed-back control with a first time constant in the operation under the phase control range;

the control means controls the valve drive electric current based on feed-back control with a second time constant in the operation under the lock pin control range; and the second time constant is smaller than the first time constant.

3. The variable valve timing controller according to claim 1, wherein:

the control means controls the valve drive electric current based on feed-back control in the operation under the phase control range; and the control means controls the valve drive electric current based on open-loop control in the operation under the lock pin control range.

4. The variable valve timing controller according to claim 1, wherein:

the second means executes the electric current feed-back control at intervals shorter than intervals, at which the first means executes the phase feed-back control.

5. A variable valve timing controller for an internal combustion engine having a crankshaft and a camshaft, the variable valve timing controller comprising:

a hydraulic variable valve timing unit configured to adjust valve timing by changing a variable cam timing (VCT) phase that is a rotational phase of the camshaft relative to the crankshaft;

a lock pin configured to lock the VCT phase at an intermediate lock position located within an adjustable range of the VCT phase;

one single hydraulic control valve configured to control oil pressure that actuates the variable valve timing unit and the lock pin; and a control unit, comprising a computer processor, for controlling a valve drive electric current that is used for actuating the single hydraulic control valve, wherein:

the control unit is configured to:

operate the single hydraulic control valve under a plurality of control ranges;

control the valve drive electric current to actuate the single hydraulic control valve based on a first control characteristic in the operation of the single hydraulic control valve under a first one of the plurality of control ranges; and control the valve drive electric current to actuate the single hydraulic control valve based on a second control characteristic in the operation of the single hydraulic control valve under a second one of the plurality of control ranges;

the first control characteristic is different from the second control characteristic;

the first one of the plurality of control ranges is a phase control range, in which the single hydraulic control valve is operated to cause the VCT phase to coincide with a target phase that is determined in accordance with an operational condition;

the second one of the plurality of control ranges is a lock pin control range, in which the single hydraulic control valve is operated to actuate the lock pin in a lock direction for locking the VCT phase and in a lock release direction for releasing the lock of the VCT phase;

the control unit is further configured to:

control the second control characteristic under the lock pin control range to have higher responsivity than the first control characteristic under the phase control range;

execute a phase feed-back control, in which a required valve control amount is computed based on a difference between the VCT phase and a target phase; and execute an electric current feed-back control, in which a target electric current is computed based on the required valve control amount, and in which the valve drive electric current is controlled based on feed-back control such that the valve drive electric current coincides with the target electric current; and the control characteristic of the electric current feed-back control in the lock pin control range is set to be faster than the control characteristic of the electric current feed-back control in the phase control range.

6. The variable valve timing controller according to claim 5, wherein:

the control unit is further configured to:

control the valve drive electric current based on feed-back control with a first time constant in the operation under the phase control range; and control the valve drive electric current based on feed-back control with a second time constant in the operation under the lock pin control range; and the second time constant is smaller than the first time constant.

7. The variable valve timing controller according to claim 5, wherein the control unit is further configured to:

control the valve drive electric current based on feed-back control in the operation under the phase control range; and control the valve drive electric current based on open-loop control in the operation under the lock pin control range.

8. The variable valve timing controller according to claim 5, wherein the control unit is further configured to:

execute the electric current feed-back control at intervals shorter than intervals, at which the phase feed-back control is executed.

* * * * *

UNITED STATES PATENT AND TRADEMARK OFFICE
CERTIFICATE OF CORRECTION

PATENT NO.        : 8,677,959 B2                          Page 1 of 1
APPLICATION NO.   : 12/878337
DATED             : March 25, 2014
INVENTOR(S)       : Haruyuki Urushihata et al.

It is certified that error appears in the above-identified patent and that said Letters Patent is hereby corrected as shown below:

On the Title Page:

Item (75) Inventor should be: Har*u*yuki Urushihata, Chir*y*u (JP)

Signed and Sealed this
Seventeenth Day of June, 2014

Michelle K. Lee
*Deputy Director of the United States Patent and Trademark Office*